April 19, 1966   J. W. BELL   3,247,513
VIDEO INTEGRATOR
Filed July 9, 1963
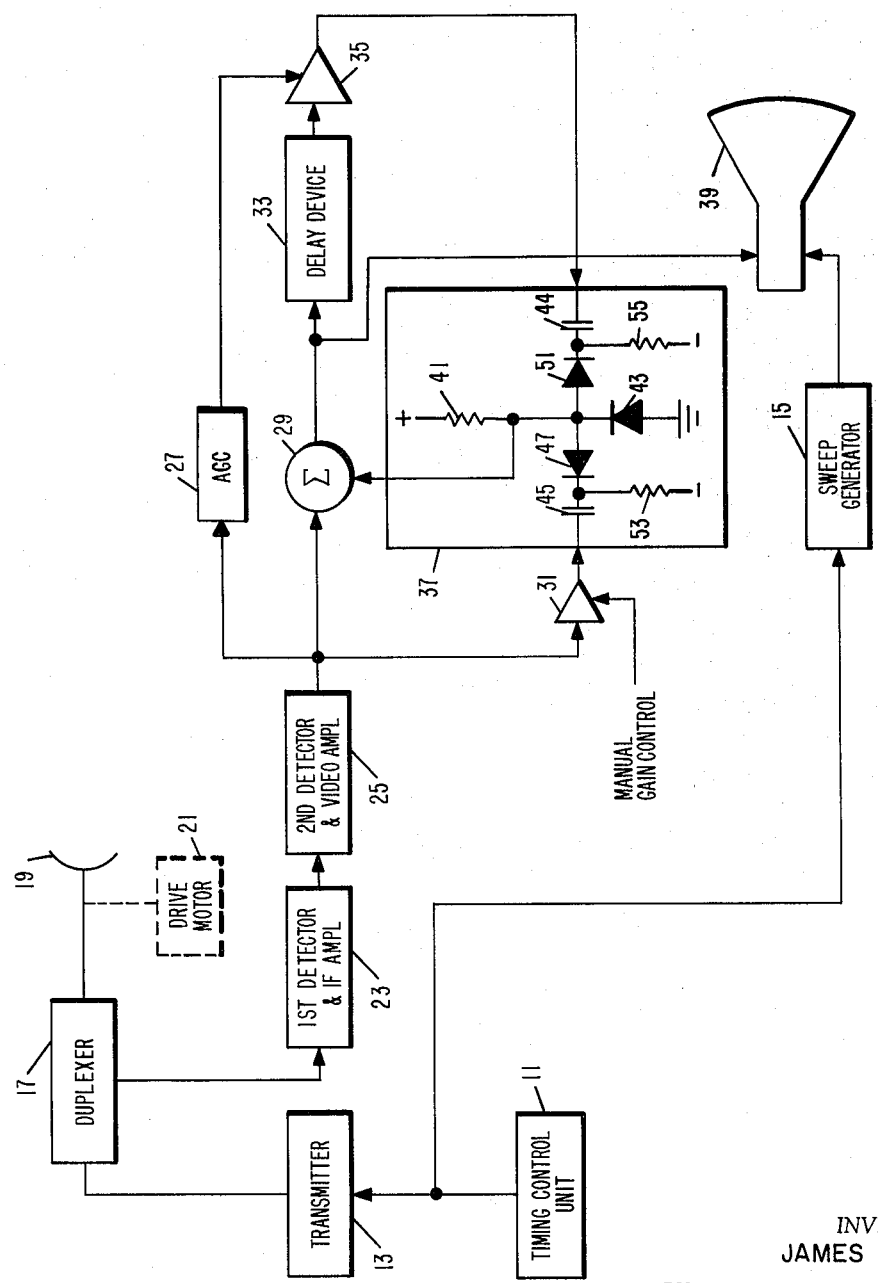
INVENTOR.
JAMES W. BELL
BY
*Philip J. McFarland*
ATTORNEY

United States Patent Office 3,247,513
Patented Apr. 19, 1966

3,247,513
VIDEO INTEGRATOR
James W. Bell, Sudbury, Mass., assignor to Laboratory for Electronics, Inc., Boston, Mass., a corporation of Delaware
Filed July 9, 1963, Ser. No. 293,756
8 Claims. (Cl. 343—17.1)

This invention pertains generally to radar systems and particularly to radar systems incorporating means for enhancing the effect of desired signals.

It has been known for many years in the art that enhancement of signals in a pulsed radar system may be accomplished by circuitry which is more responsive to periodic signals than to randomly occurring signals. Thus, it is known that echo signals (which are periodic) may be processed in such a manner that they may be distinguished even when they occur in the presence of noise signals (which are random in nature) of higher amplitude. It is also known that desired echo signals may be distinguished from interfering signals from other radar systems when there is a difference in periodicity between the two types of signals.

The so-called "video integrator" has been used extensively in the art to enhance desired signals. In one well-known embodiment, the video integrator comprises means, as an ultrasonic delay line, for accepting the output signal of the video amplifier, delaying such signal for one pulse repetition period of the system and then adding the so delayed signal to the next occurring output signal of the video amplifier. Consequently, echo signals from each target are added directly while noise signals are added in a root mean square manner. In other words signals occurring at the pulse repetition frequency of the system are enhanced more than signals not occurring at the pulse repetition frequency of the system.

Operation of known video integrators is such that the output thereof builds up to a maximum at the end of a train of echo pulses and then decays in a manner determined by such maximum and the circuit parameters of the integrator being used. That is, the sensible output of known video integrators lasts longer than its input. If, therefore, a known video integrator is used in a scanning radar system the integrator itself introduces an azimuth error, called "azimuth smearing" in the indicated position of every target.

Unfortunately, the magnitude of the azimuth error depends, in addition to the size of the target, on many other factors in a practical system. For example, the kind of phosphor in, and the ambient light conditions under which the cathode ray tube indicator is used, the magnitude of the interfering or noise signals and the threshold level of the system, the antenna beam width and scanning velocity all also affect the amount of azimuth error. Consequently, unless the system gain and operating condition of the video integrator are continually adjusted, it is almost impractical to use known video integrators with a general purpose search radar system.

Even when the amount of azimuth smearing of targets is tolerable, it is obvious that a decrease in resolution between targets must be accepted. This means that when there are small closely spaced targets, it becomes almost impossible to distinguish between them or to ascertain how many targets there are, except after careful adjustment of the system and the video integrator.

Another shortcoming of known video integrators is their susceptibility to bursts of noise or transient signals. When either type of such unwanted signals occur, known video integrators operate so as to completely obscure all echo signals. This shortcoming of known video integrators derives from their predilection to oscillate spontaneously. It will be recognized that the basic theory of operation is quite similar to that of many well known oscillators in that the video integrator incorporates a positive feedback loop. It is extremely important, therefore, that the design, construction and operation of known video integrators be carefully controlled to avoid conditions favorable to spontaneous oscillations which would make it impossible to detect any target echoes at all.

Therefore it is an object of this invention to provide in a pulsed radar system, an improved enhancing device which will process echoes from large targets in a different manner from echoes from small targets so as to improve the capability of the device in detecting small echo signals and to eliminate azimuth smearing.

Still another object of the invention is to provide an improved video enhancing device which has no detrimental effect upon the resolution of the system in which it is incorporated.

Still another object of the invention is to provide an improved video enhancing device which is insensitive to transient signals and to noise bursts.

Still another object of the invention is to provide an improved video enhancing device which may not oscillate.

Still another object of the invention is to provide an improved enhancing device which meets the foregoing objects using standard, easily adjusted components.

These and other objects of the invention are attained by providing a gated video integrator which is capable of producing an output signal only when an output signal from the video amplifier of the radar system in which the video integrator is incorporated exceeds a predetermined level. Thus, so long as signals are returned from a target, such signals are added, but as soon as the antenna turns away from the target, the output of the video integrator is, in effect, "switched off."

For a more complete understanding of the invention reference is now made to the drawing, the single figure of which is a combined block and schematic diagram of a radar system incorporating the invention and to the accompanying explanation of the details of the drawing.

Referring now to the drawing, it may be seen that a radar system incorporating the invention preferably comprises a conventional transmitter-receiver (except that the receiver is modified) so as to produce an output signal having the required characteristics and an indicator. Thus, there is shown a timing control unit 11 which produces a train of trigger pulses for a transmitter 13 and a sweep generator 15. The transmitter 13 in turn produces a pulse of radio frequency energy in response to each trigger pulse from timing control unit 11. Each pulse of radio frequency energy passes through a duplexer 17 to a beam-forming antenna 19, whence it is propagated through space. The beam-forming antenna 19, of course, may be mechanically scanned so that the beam is caused to cover any desired volume of space, as by a drive motor 21. Energy reflected from targets (not shown) is returned through the beam-forming antenna 19 and the duplexer 17 to a first detector and I.F. amplifier 23. The output of the first detector and I.F. amplifier 23 is fed through a second detector and video amplifier 25. It will be recognized that the elements described heretofore are conventional and may be of any conventional design, so long as pulses of radio frequency energy are emitted from the antenna. It will also be recognized that the output signal of the second detector and video amplifier 25 is a composite signal consisting of a portion due to energy reflected back from targets (which portion is correlated in time) and a portion due to internally or externally generated noise or interfering signals from another radar system (which portion is not correlated in time). The output of the second detector and video amplifier 25 is divided into three paths. The first of these paths leads to a conventional automatic gain control circuit 27; the second path leads to a summing amplifier 29; and, the third path leads to an amplifier 31. The output of the summing amplifier 29 is fed through a delay device 33, as a solid ultrasonic delay line, arranged so as to delay signals by an interval substantially equal to the interval between trigger pulses out of the timing control unit 11. The output of the delay device 33 is fed to an amplifier 35 whose gain is controlled by the output of the automatic gain control circuit 27. The output of the amplifier 35 in turn is fed to a diode coincidence gate 37 (to be described in more detail immediately hereinafter) along with the output of the amplifier 31. The diode coincidence gate produces a signal which is applied to the summing amplifier 29. The intensity control electrode of a cathode ray tube 39, in turn, is controlled by the output of the summing amplifier 29. The deflection control electrodes of the cathode ray tube 39 are energized by the output of the sweep generator 15 in any convenient manner.

The diode coincidence gate preferably comprises an isolating resistor 41 connected to a source of D.C. potential (not shown). While the amplitude of the voltage output of the source of D.C. potential is not critical to the invention it is preferred that it be several orders greater than the amplitude of the largest signal out of the amplifiers 31, 35. The isolating resistor 41 is connected through a diode 43 as shown to a reference point as ground. The output of the amplifier 31 is connected through a capacitor 45 and diode 47 to the high side of the diode 43, while the output of the amplifier 35 is connected through a capacitor 44 and diode 51 to the same junction point. Diodes 47 and 51 are biased, respectively, through resistors 53, 55 from a source of D.C. potential (not shown) in such a manner that in the absence of positive input pulses from the amplifiers 31, 35, both are conductive. This in turn means that the diode 43 is conductive. Consequently, the voltage at the junction of the isolating resistor 41 and the diode 43 is substantially at ground potential. When a positive pulse passes through the capacitor 45, diode 47 is caused to pass to its non-conductive state. Such a change, however, has no effect on diode 43 unless at the same time a positive pulse passes through capacitor 44 to place diode 51 in its non-conductive state. When, however, coincidence between two positive pulses obtains, diode 43 is cut-off causing the voltage at the junction point of the isolating resistor 41 and the diode 43 to charge toward the voltage on the high side of the isolating resistor 41.

It will be recognized by those having skill in the art that the shape of the waveform output of the summing amplifier 29 is degraded upon passing through the delay device 33. Since, however, the diode coincidence gate 37 may produce a signal only when both diodes 47, 51 are caused to pass to their non-conductive states and, since the shape of the signal which causes diode 47 to pass to its non-conductive state is not degraded, it follows that the output signal of the diode coincidence gate 37 is of substantially the same shape as the other input signal to the summing amplifier 29. In other words, the wave shape of the output signal from the diode coincidence gate 37 is substantially the same as the wave shape of the video signal to be integrated. Further, it will be recognized that the delay of the delay device 33 may be adjusted in fabrication so that the two signals are exactly synchronized.

It should also be noted here that the gain of the amplifier 35 is adjusted to the value required for optimum signal-to-noise improvement and is then held to such value by action of the automatic gain control circuit 27. The gain of the amplifier 31 is set to limit the level of signals into the diode coincidence gate 37 to the value expected from the smallest target at maximum range. This value may, of course, be varied by changing a conventional manual gain control (not shown, but indicated by the lead line marked "Manual Gain Control").

With the foregoing in mind, the mode of operation of a system incorporating the invention may be clearly seen. Thus, with respect to a small target (as aircraft a long distance from the radar), the amplifier 31 is conditioned so as to produce a number, for example 5, of substantially similar pulses corresponding to the number of "hits" on the target as the antenna of the system is scanned. The first of these signals actuates the delay device 33 through the summing amplifier 29 and one side of the diode coincidence gate 37 through the amplifier 31. Since, however, the second side of the diode coincidence gate 37 is not then actuated (because of the delay of the delay device 33) there is no output signal from the diode coincidence gate 37. Upon the occurrence of the second through the fifth pulses, the diode coincidence gate 37 is conditioned to produce an output signal as pointed out hereinbefore since there are two signals present simultaneously on its inputs. It should be noted here that the amplitude of the signal output from the diode coincidence gate 37 is limited to the value of the smaller of its two input signals. This is so since, whenever the output signal from the diode coincidence gate 37 tends to rise above the value of the smaller of the input signals, the diode in circuit with such smaller input signal (diode 47 or 51) becomes conductive, and, therefore, acts to clamp the value of the output signal. Thus, in the illustrated case, four relatively constant amplitude pulses are produced by the diode coincidence gate 37 when the gain of the amplifier 35 is set so that the amplitude of the input signal which switches diode 51 is equal to or greater than the amplitude of the signal which switches diode 47. Even if this condition does not obtain, since the output signal of the diode coincidence gate 37 is added to the next following signal into the summing amplifier 29, it is obvious that the signal recirculated through the delay device 33 must, perforce, build up rapidly to a greater amplitude than the signal out of the amplifier 31.

Immediately after the fifth pulse has passed, the diode coincidence gate 37 is no longer enabled, since it no longer may receive its two required inputs. Consequently, the signal to the intensity control electrode of the cathode ray tube 39 is immediately cut off and the circuit is readied for processing signals from another target.

It will be evident to those having skill in the art that, since noise signals are not correlated from scan-to-scan of the system, the diode coincidence gate 37 will not be as frequently enabled by such signals as it is by repetitive signals of a correlated nature. This means in turn, that unless noise signals chance to occur at the same time in two successive scans, such signals have no effect on the cathode ray tube, nor do they build up in the recirculating loop including the delay device 33. Consequently, the effect of noise signals is markedly reduced. In this connection it should be observed that the effect of noise may be reduced even more by providing additional recirculating loops to delay each signal by a length of time equal to twice the period between transmitted pulses and providing a matrix of gates to produce a signal only upon coincidence of three or more signals. It will be noted here that the incorporation of additional recirculating loops introduces an azimuth error, but no azimuth smearing, into the presentation of targets on a plan position indicator. The error arises from the fact that the apparent center of each target is shifted by an amount equal to one half the angular distance through which the antenna moves in the time between the first return from a target and an output signal from the matrix of gates. Obviously, however, such error is a direct function of the pulse repetition frequency of the system, the angular speed at which the antenna is scanned and the number of delay devices used. It is a simple matter, therefore, to compensate for such error when desired by offsetting the deflection coils of the cathode ray tube or by appropriately energizing the deflection elements thereof.

With respect to large targets, as from ground clutter, and assuming that the adjustment of the amplifiers 31, 35 is not changed, the operation of the illustrated circuit is essentially the same except that such targets ordinarily produce a very much larger number of echo pulses. Since, however, the diode coincidence gate 37 still requires two input pulses to work and since the amplitude of the signal to the intensity control electrode of the cathode ray tube 39 is independent of the number of echo pulses over, say 3, the disclosed video integrator introduces no azimuth error in the display of such targets.

It should be noted that, in the illustrated case, there is no azimuth error introduced in the display on the viewing screen of the cathode ray tube 39. The illustrated circuit is, however, rather susceptible to interfering signals whose repetition frequency is close to the repetition frequency of the illustrated system. This is so, since there is a path from the 2nd detector and video amplifier 25 through the summing amplifier 29 to the intensity control electrode of the cathode ray tube 39. This means that "non-integrated" signals may not be eliminated. If desired, however, the output of the illustrated circuit may be taken from the junction of the resistor 41 and the diode 43. Consequently only "integrated" signals may actuate the control electrode of the cathode ray tube 39. It will be observed that the just suggested connection will introduce an azimuth error equal to one half the change in azimuth of the system antenna between pulses. While such an error is ordinarily insignificant the fact that it is constant, regardless of target size, makes it easy to compensate. That is, the deflection electrodes of the cathode ray tube 39 may be offset or energized in any conventional manner so that the azimuth error is eliminated when desired.

Other modifications of the invention will be apparent to those having skill in the art. For example, it is not necessary that the particular diode coincidence gate 37 shown and described be used. The delay device 33 further need not be adjusted exactly, it being obvious that a variable delay device to "pad" the delay could be incorporated in circuit with the delay device. Further it is obvious that conventional control means, as a sensitivity time control circuit, could be incorporated in the system. Still further it is obvious that the pulse repetition frequency of the system need not be constant but rather need only be controlled in accordance with a known program.

In view of the foregoing, it is felt that the invention should not be restricted to the particular embodiment thereof which has been illustrated and described, but rather should be limited only by the spirit and scope of the appended claims.

What is claimed is:

1. A pulsed radar system by means of which a volume of space is continuously scanned with a beam of electromagnetic energy and a train of video pulses is produced for each target illuminated by such beam, the system including a video integrator whereby the effect of each train of video pulses on the viewing screen of a cathode ray tube is enhanced as compared to video signals from any other source, the video integrator comprising:
   (a) means for delaying each pulse in each train of video pulses for a period of time equal to the interval between each such pulse;
   (b) means for enabling a gating circuit only upon the coincidence of each delayed pulse and the next following pulse to produce a train of integrating signals;
   (c) and means for adding each one of the signals in the train of integrating signals with the contemporaneously existing pulse; and,
   (d) means for applying the signal resulting from such adding to the means for delaying each pulse and to the intensity control electrode of the cathode ray tube to produce a visible image thereon and to condition the gating circuit for the next video pulse in the train thereof.

2. A pulsed radar system as in claim 1 wherein the means for delaying each pulse in each train of video pulses has a delay interval equal to an integral number times the period between transmitted pulses, wherein said integral number is greater than one.

3. A pulsed radar system as in claim 2 wherein the means for enabling the gating circuit includes a limiting amplifier to convert the train of video pulses to a train of signals of substantially constant amplitude.

4. A video integrator for the output signals of the video amplifier in a radar system comprising:
   (a) a coincidence gate having first and second input sides;
   (b) means for limiting the amplitude of video pulses out of the video amplifier and applying such limited pulses to the first side of said coincidence gate;
   (c) delay means for delaying video pulses out of the video amplifier for a period substantially equal to the interval between transmitted pulses in the radar system;
   (d) means for applying the output of the delay means to the second side of said coincidence gate to produce a signal therefrom, the amplitude of such signal being equal to the amplitude of the smaller of the two signals applied to the coincidence gate; and,
   (e) means for adding each signal from the coincidence gate to a corresponding video pulse out of the video amplifier to produce a train of recirculating signals, the amplitude of each such recirculating signal being substantially constant.

5. A video integrator for processing a train of output pulses from a video amplifier in a radar receiving system comprising:
   (a) delay means to delay the video pulses from the video amplifier for a predetermined period;
   (b) coincidence means connected to the output of said delay means and responsive to the train of pulses from the video amplifier for providing an output signal only upon the coincidence of a pulse from said delay means and a pulse from the video amplifier;
   (c) and means connected to the output of said coincidence means for adding each signal from said coincidence means to a corresponding pulse from said video amplifier to provide a train of video pulses free of undesired noise signals.

6. A video integrator as defined in claim 5 wherein the delay means provides a delay interval of each pulse in each train of received pulses for a period of time substantially equal to the interval between transmitted pulses.

7. A pulsed radar system having a continuously rotating antenna comprising:
   (a) means for transmitting in a beam at a substantially constant repetition frequency, pulses of electromagnetic energy;
   (b) means for continuously rotating the beam;
   (c) means for receiving energy reflected back from target intercepted by said beam to provide a train of video pulses;
   (d) a coincidence gate having first and second sides;
   (e) a delay device responsive to said received train of video pulses to impart a delay interval equal to the period of time between transmitted pulses;
   (f) a first amplifier means connected to the output of said delay device for applying said video pulses to the first side of said coincidence gate;
   (g) means connected to said receiving means for limiting the amplitude of said video pulses and applying such limited pulses to the second side of said coincidence gate;
   (h) said coincidence gate producing a signal upon the simultaneous occurrence of signal inputs at both first and second sides;

(i) and means for adding each signal from said coincidence gate to a corresponding video pulse in said received train of video pulse to produce a train of signals, the amplitude of each signal being substantially constant.

8. In a radar system, a video integrator for processing a received train of video pulses comprising:
  (a) delay means to delay the video pulses for a predetermined time period;
  (b) coincidence circuit means connected to the output of said delay means and responsive to an enabling signal to provide an output signal representative of said delayed video pulses upon the occurrence of a delayed video pulse having a predetermined characteristic;
  (c) and adding means connected to the output of said coincidence circuit means for adding the output signal from said coincidence circuit means to a received video pulse to produce an integrated video signal.

References Cited by the Examiner
UNITED STATES PATENTS

| | | | |
|---|---|---|---|
| 3,007,156 | 10/1961 | Barber | 343—6.5 |
| 3,029,428 | 4/1962 | Matthews | 343—11 |
| 3,157,875 | 11/1964 | Matsukasa et al. | 343—17.1 |

LEWIS H. MYERS, *Primary Examiner.*

CHESTER L. JUSTUS, MAYNARD R. WILBUR,
*Examiners.*

E. T. CHUNG, P. M. HINDERSTEIN,
*Assistant Examiners.*